(12) United States Patent
Lin et al.

(10) Patent No.: US 8,536,484 B2
(45) Date of Patent: Sep. 17, 2013

(54) LASER ENGRAVERS WITH A MASKING MECHANISM

(75) Inventors: Hsien-Chang Lin, Taipei Hsien (TW); Che-Min Kung, Taipei Hsien (TW)

(73) Assignee: Great Computer Corporation, Taipei Hsien (TW)

( * ) Notice: Subject to any disclaimer, the term of this patent is extended or adjusted under 35 U.S.C. 154(b) by 272 days.

(21) Appl. No.: 13/019,816

(22) Filed: Feb. 2, 2011

(65) Prior Publication Data

US 2012/0193333 A1 Aug. 2, 2012

(51) Int. Cl.
*B23K 26/00* (2006.01)
*B23K 26/12* (2006.01)

(52) U.S. Cl.
USPC ................................. 219/121.68; 219/121.86

(58) Field of Classification Search
USPC .............. 219/121.6, 121.63–121.72, 121.84, 219/121.85, 121.86; 15/303, 312.1, 317
See application file for complete search history.

(56) References Cited

U.S. PATENT DOCUMENTS

| | | | |
|---|---|---|---|
| 4,985,780 A * | 1/1991 | Garnier et al. ............ | 219/121.68 |
| 5,659,921 A * | 8/1997 | Narayan .......................... | 15/349 |
| 5,906,760 A * | 5/1999 | Robb et al. ................ | 219/121.67 |
| 6,388,228 B1 * | 5/2002 | Lai ............................. | 219/121.6 |
| 6,881,924 B2 * | 4/2005 | Lai ........................... | 219/121.67 |
| 6,984,803 B1 * | 1/2006 | Garnier et al. ........... | 219/121.82 |
| 7,038,166 B2 * | 5/2006 | Denney et al. ........... | 219/121.86 |
| 7,165,288 B2 * | 1/2007 | Lai ................................. | 15/303 |
| 8,309,881 B2 * | 11/2012 | Li ............................ | 219/121.68 |
| 2009/0314753 A1 * | 12/2009 | Kosmowski ............. | 219/121.72 |

FOREIGN PATENT DOCUMENTS

TW 577364 2/2004

* cited by examiner

*Primary Examiner* — Samuel M Heinrich

(74) *Attorney, Agent, or Firm* — Muncy, Geissler, Olds & Lowe, PLLC

(57) ABSTRACT

Laser engravers with a masking mechanism comprise a machine body, a laser-engraving mechanism inside the machine body, a working platform, and an exhauster. The laser-engraving mechanism includes a lens-cart rail that moves back and forth along a working track. The exhauster includes air outlets behind the working platform. The masking mechanism, which includes a reelable curtain-sheet, is installed above the air outlets so that while processing, the curtain-sheet is reeled out above the working platform and an air induction channel is formed to increase the working efficiency of the exhauster.

9 Claims, 8 Drawing Sheets

LASER ENGRAVERS WITH A MASKING MECHANISM

BACKGROUND OF THE INVENTION

1. Field of the Invention

The present invention relates to laser engravers with a masking mechanism, and more specifically to laser engravers with a masking mechanism on the machine body, wherein an air induction channel is formed above a working platform to efficiently expel the hot exhaust and dust produced during the engraving process.

2. Description of the Related Art

Due to the advantages of broad applications, high precision, and rapid cutting, laser engravers are widely used. A conventional laser engraver, for instance, No. 219974 in Taiwan, comprises a machine body, which is mainly a panel jointed with a base. A laser-engraving mechanism, a platform and an air-collecting bin are connected to the inside of the machine body, where the air-collecting bin is jointed beneath the platform, and the laser-engraving mechanism is jointed above the platform. Therefore, while the laser engraver is processing a workpiece on the platform, the crumbs and smoke produced during the process can be brought into the air-collecting bin and expelled from the air outlet behind the air-collecting bin to achieve the expulsion of crumbs and smoke.

However, while operating the mentioned above laser engraver, the route of the airflow is often blocked by the workpiece. The ascending crumbs and smoke produced above the workpiece still dissipate from above the workpiece, and cannot be expelled by the air-collecting bin beneath effectively. As a result, not only the workpiece may be damaged from the heat easily, but also the dissipated crumbs easily piles upon the members inside the machine body. Thus, maintenance of the laser engraver becomes more difficult.

SUMMARY OF THE INVENTION

An object of the present invention is to provide laser engravers with a masking mechanism, which is installed to a machine body and positioned above air outlets. The masking mechanism is connected to between one side of the machine body and a lens-cart rail to mask the area between the lens-cart rail and the one side of the machine body, so that an air induction channel is formed to increase the working efficiency of an exhauster.

Another object of the present invention is to provide laser engravers with masking mechanisms, which are installed both in the side and the backside of a machine body. Each of the masking mechanisms is connected to between one side of the machine body and a lens-cart rail to mask the area between the lens-cart rail and the one side of the machine body, so that an air induction channel is formed thereby masking most of the area above the working platform to increase the working efficiency of an exhauster.

In order to attain the objects as mentioned above, laser engravers according to the present invention comprise at least a masking mechanism, a machine body, a laser-engraving mechanism inside the machine body, a working platform, and an exhauster. The laser-engraving mechanism includes a lens-cart rail slidably mounted on a working track. The exhauster is positioned behind the working platform and is provided with at least one air outlet thereof. A masking mechanism is connected to between one side of the machine body and a lens-cart rail to mask the area between the lens-cart rail and the one side of the machine body, so that an air induction channel is formed.

While implementation, the masking mechanism includes a rod member and a curtain-sheet reeled onto the rod member. The rod member is installed on the machine body, and connected to one end of the curtain-sheet, and the other end of the curtain-sheet is combined with the lens-cart rail, so that when the lens-cart rail moves above the working platform, the curtain-sheet is reeled out above the working platform.

While implementation, the masking mechanism further includes a reeling component for the curtain-sheet to be reeled onto the rod member.

While implementation, the curtain-sheet is provided with multiple through holes, and the lens-cart rail is provided with a connecting member to buckle to the through holes.

While implementation, the curtain-sheet is made of a transparent material.

While implementation, another masking mechanism is installed in the side of the machine body, the rod member is installed on the machine body, and connected to one end of the curtain-sheet, and the other end of the curtain-sheet is jointed with the lens-cart rail, the curtain-sheet can be reeled out above the working platform.

For a full understanding of detailed structure and relationships among the elements of the present invention of laser engravers with a masking mechanism, detailed description accompanied drawings is made hereinafter.

DETAILED DESCRIPTION OF THE EMBODIMENTS OF THE INVENTION

Figure 1:
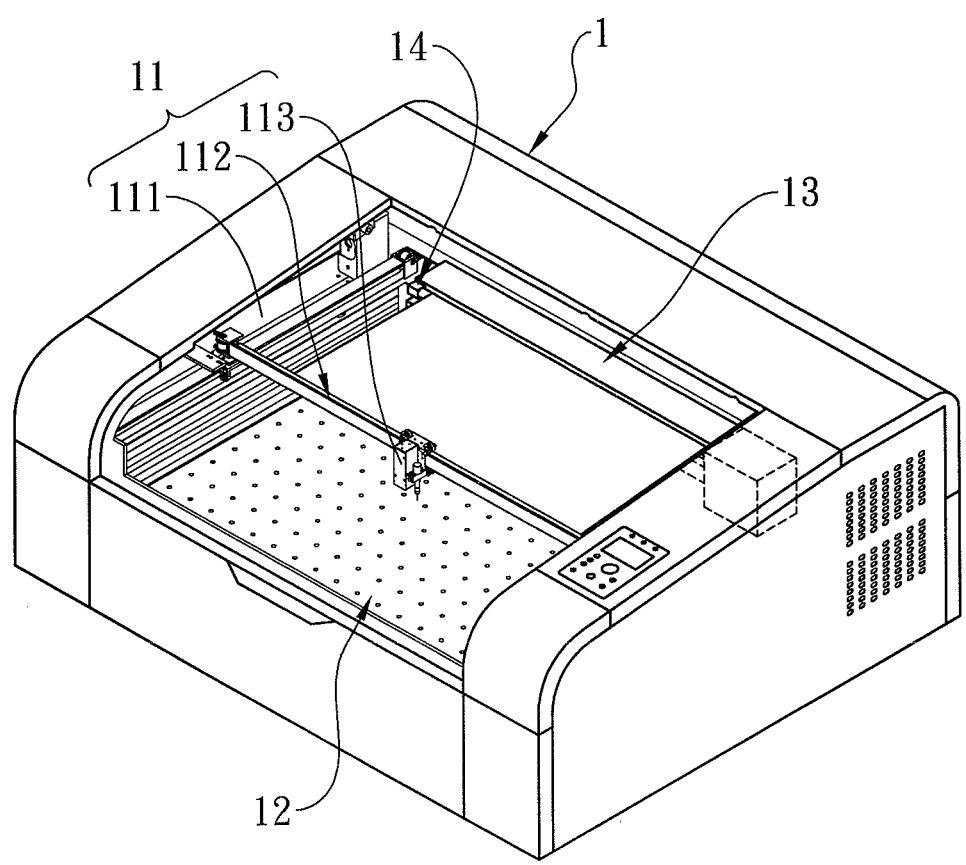
FIG. 1 is a perspective view of laser engravers with a masking mechanism according to an embodiment of the present invention.
Figure 2:
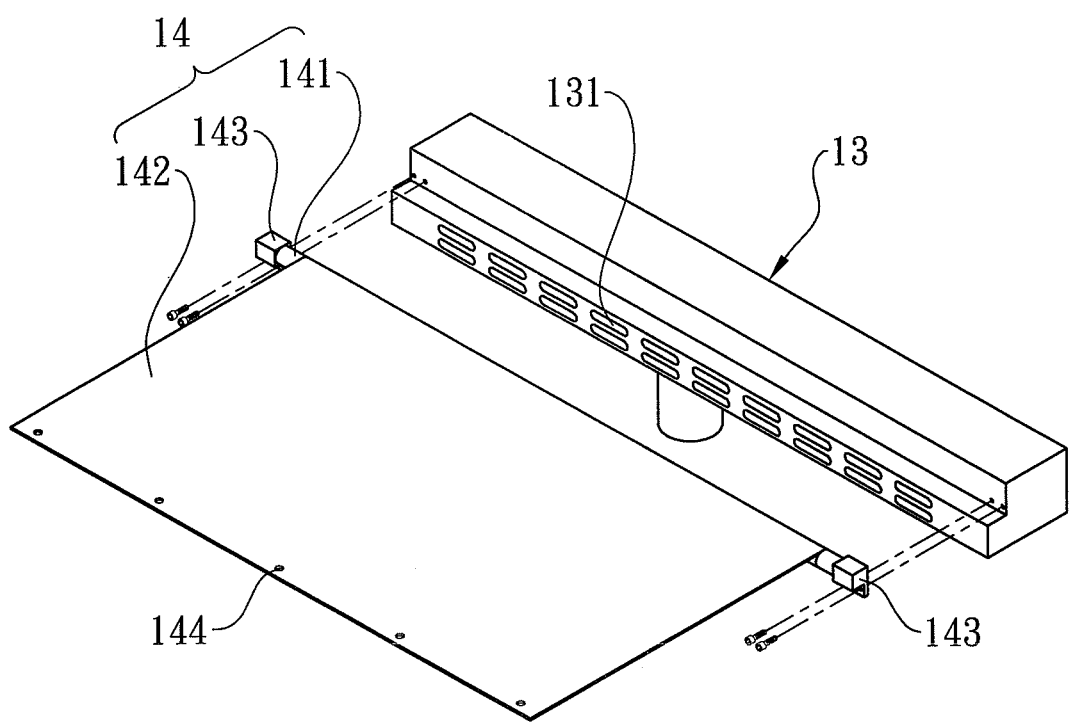
FIG. 2 is a schematic view of the masking mechanism and the exhauster of laser engravers assembled with a masking mechanism in FIG. 1 of the present invention.

FIG. 1 and FIG. 2 illustrate a perspective view of laser engravers with a masking mechanism according to an embodiment of the present invention. The laser engravers with the masking mechanism of the present invention comprises a machine body 1, a laser-engraving mechanism 11 inside the machine body 1, a working platform 12, an exhauster 13, and a masking mechanism 14.

Figure 4:
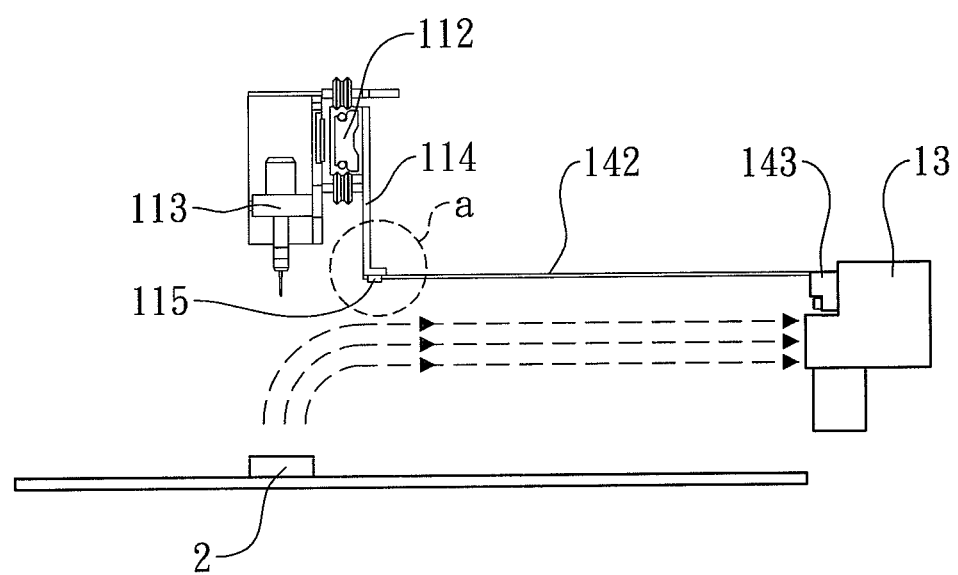
FIG. 4 is a partial schematic view of the reeled out curtain-sheet of laser engravers with a masking mechanism according to an embodiment in FIG. 1 of the present invention.

The laser-engraving mechanism 11 comprises a lens-cart rail 112 slidably mounted on a working track 111 so that the lens-cart rail 112 can move back and forth along the working track 111. A lens-cart 113 for laser engraving is disposed on the lens-cart rail 112. The lens-cart rail 112 on one side of facing the exhauster 13 is connected to an L-shaped connecting member 114, which includes a plurality of bumps 115 on the bottom of the connecting member 114, as shown in FIG. 4. The exhauster 13 is installed behind the working platform 12 inside the machine body 1, and the exhauster 13 includes a plurality of air outlets 131 above the working platform 12 and positioned relative to the working platform 12.

Figure 3:
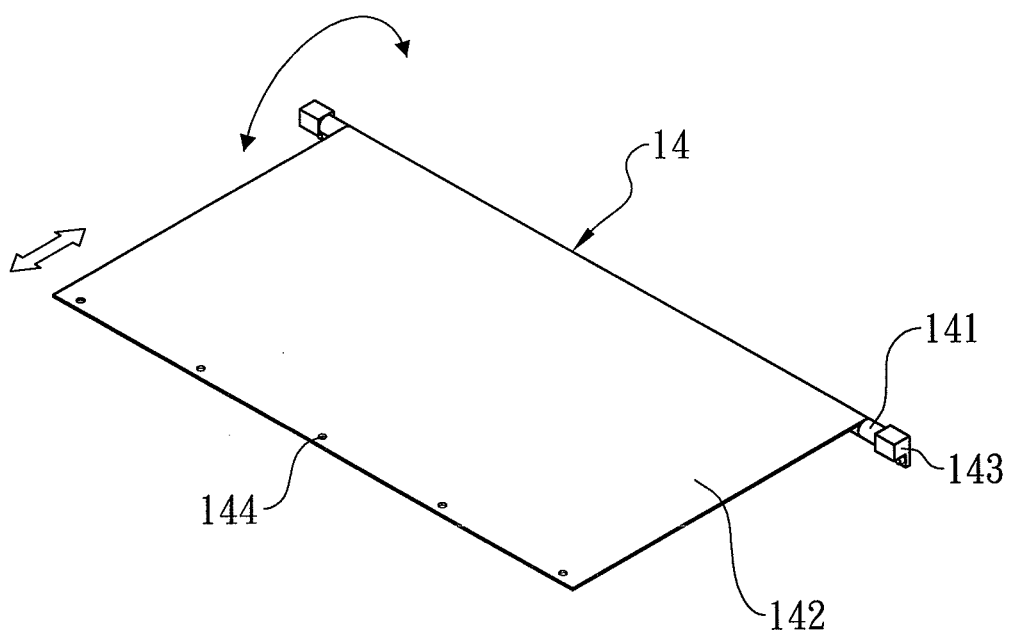
FIG. 3 is a perspective view of the reeled out masking mechanism of laser engravers with a masking mechanism in FIG. 1 of the present invention.
Figure 5A:
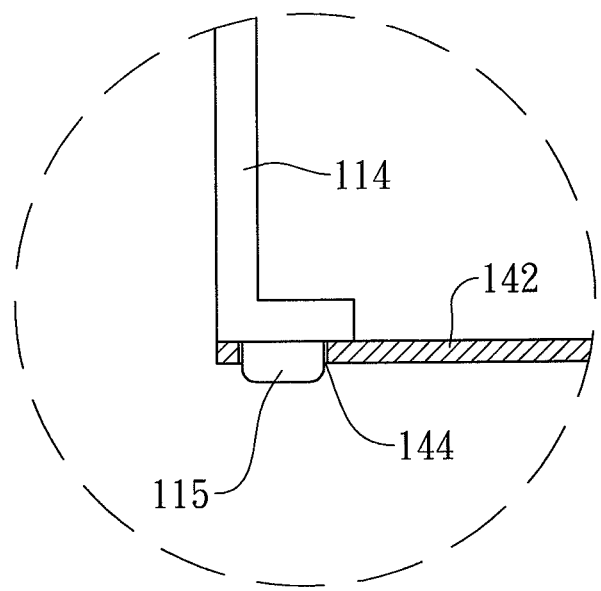
FIG. 5A is a cross-sectional view of the curtain-sheet buckling to the connecting member within the area a in FIG. 4 of laser engravers with a masking mechanism of the present invention.
Figure 5B:
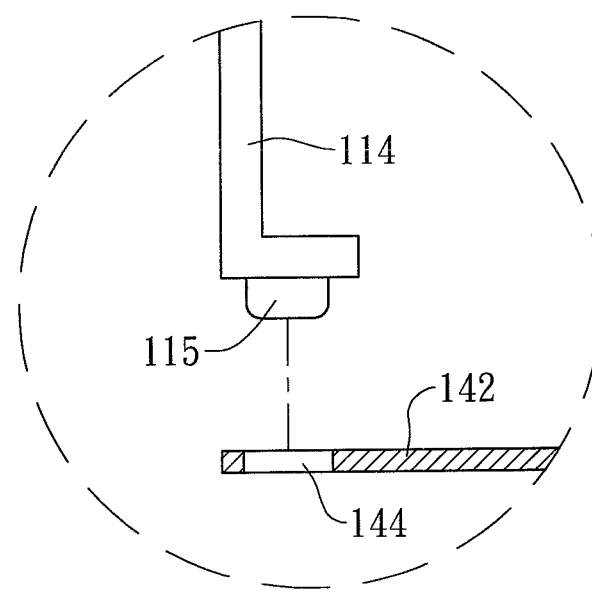
FIG. 5B is a cross-sectional view of the curtain-sheet before buckling to the connecting member within the area a in FIG. 4 of laser engravers with a masking mechanism of the present invention.
Figure 6:
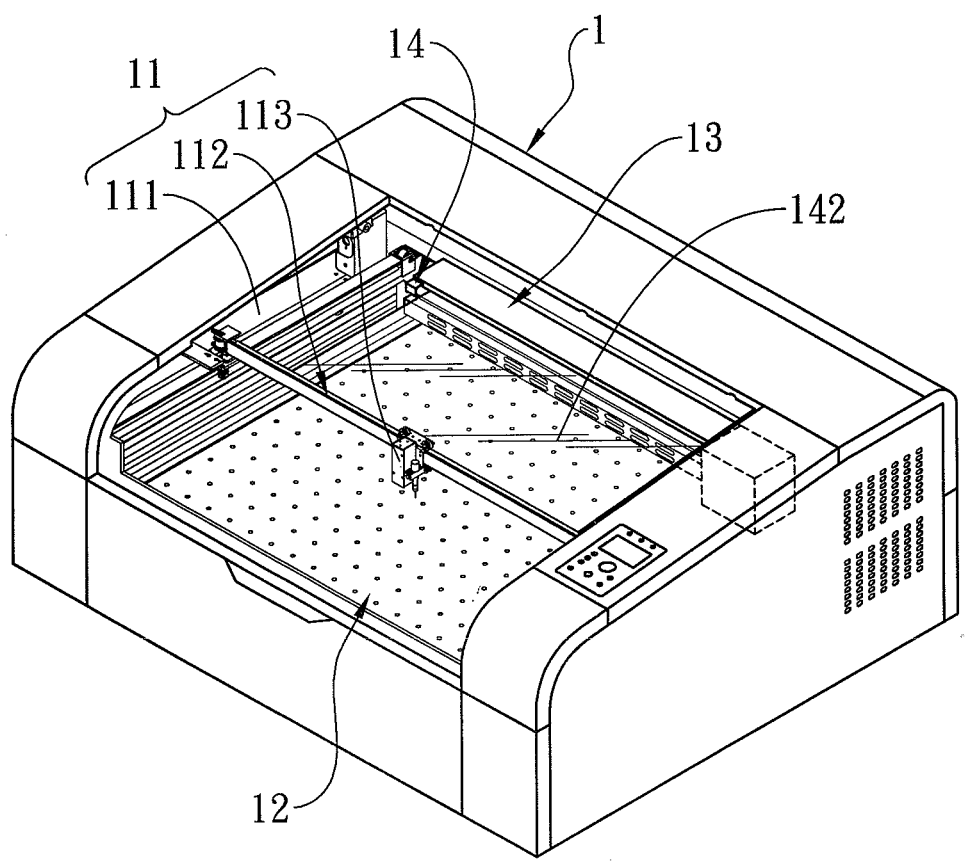
FIG. 6 is a perspective view of laser engravers with a masking mechanism according to another embodiment of the present invention.

The masking mechanism 14 is installed to a position above the air outlets 131 of the exhauster 13 in the machine body 1, which comprises a rod member 141, a reeled curtain-sheet 142 reeled onto the rod member 141, and a reeling component 143, as shown in FIG. 3. The rod member 141 is screwed at the exhauster 13 in the machine body 1. One end of the curtain-sheet 142 is connected to the rod member 141, and the other end of the curtain-sheet 142 is disposed with through holes 144 for buckling to the bumps 115 on the bottom of the connecting member 114 so that the curtain-sheet 142 and the lens-cart rail 112 are jointed as shown in FIG. 5. The reeling component 143 is provided with an elastic member for providing an elastic force to reel the curtain-sheet 142 onto the rod member 141 after the curtain-sheet 142 is reeled out.

While implementation, the lens-cart 113 of the masking mechanism 11 is processing a workpiece 2 placed on the working platform 12, the lens-cart rail 112 is moving towards the side of the machine body 1. At the same time the curtain-sheet 142 of the masking mechanism 14 is being reeled out and masking the area above the working platform 12. Hereby an air induction channel is formed beneath the curtain-sheet 142 so that the heat and crumbs will be kept beneath the curtain-sheet 142, sucked into the air outlets 131 along beneath the curtain-sheet 142, and expelled by the exhauster 13. In addition, after finishing the process, while the lens-cart rail 112 is moving towards the backside of the machine body 1, the reeling component 143 hereby reels the curtain-sheet 142 onto the rod member 141.

While implementation, the curtain-sheet 142 is made of a transparent material so that the whole laser-engraving process can be clearly observed.

Figure 7:
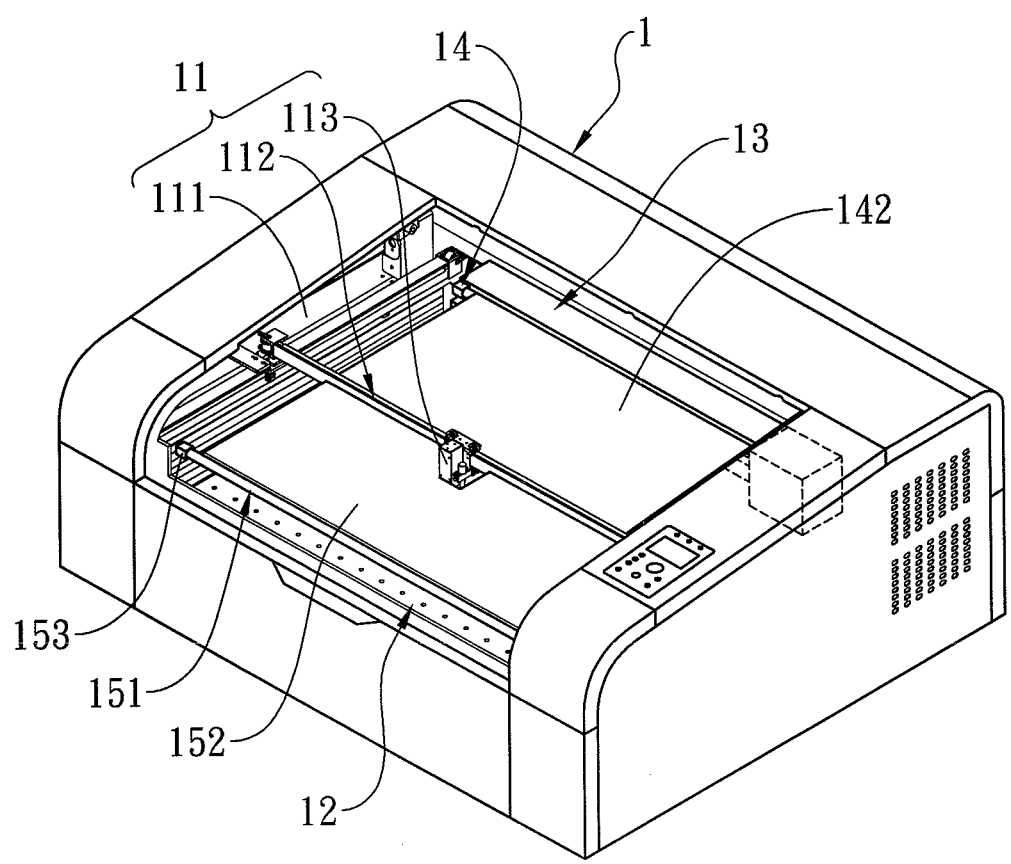
FIG. 7 is a perspective view of laser engravers with a masking mechanism according to another embodiment of the present invention.

FIG. 7 illustrates another embodiment of laser engravers with a masking mechanism of the present invention, which is based on the first embodiment. Another masking mechanism 15 is installed in the side of the machine body 1. A second rod member 151 of the masking mechanism 15 is combined to the machine body 1 with a second reeling component 153 at both ends of the second rod member 151. A second curtain-sheet 152 is combined to the second rod member 151 and the lens-cart rail 112 in the same way as the curtain-sheet 142 in the first embodiment and is reeled out above the working platform 12. In addition, when the lens-cart rail 112 is moving towards the side of the machine body 1, the second reeling component 153 hereby reels the second curtain-sheet 152 onto the second rod member 151 automatically.

Figure 8:
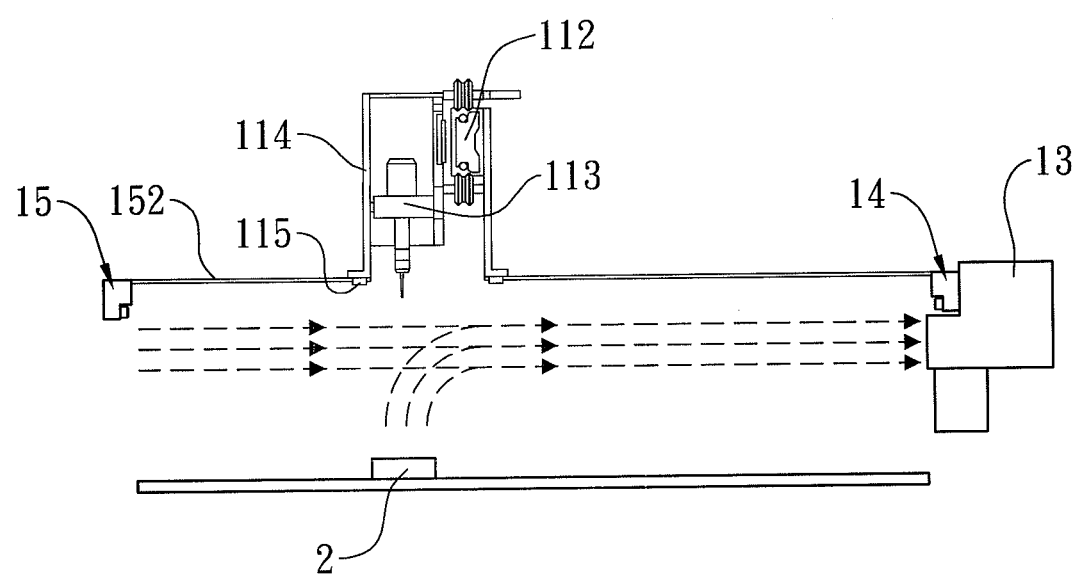
FIG. 8 is a partial schematic view of the reeled out curtain-sheet of laser engravers with a masking mechanism in FIG. 7 of the present invention.

Thereby, the two masking mechanisms 14,15 can be reeled out while the lens-cart rail 112 is moving towards the side of the machine body 1, and can be reeled automatically while the lens-cart rail 112 is moving towards the back side of the machine body 1, so that the two masking mechanisms 14,15 can mask most of the area above the working platform 12, greatly increase the working efficiency of the exhauster 13, as shown in FIG. 8, and expel most of the heat and crumbs produced during the laser-engraving process.

While implementation, the curtain-sheets 142,152 are made of a transparent material so that the whole laser-engraving process can be clearly and conveniently observed.

Therefore, the present invention has the following advantages:

1. While laser engraving, a curtain-sheet of the masking mechanism behind the lens-cart rail can be reeled or reeled out in coordination with the lens-cart rail moving back and forth, so that the curtain-sheet masks the area between the lens-cart rail and the air outlets of the exhauster above the working platform, subsequently increases the working efficiency of the exhauster, and expels most of the heat and crumbs produced during the laser engraving process through the exhauster.

2. In the of the lens-cart rail can be provided with another masking mechanism to mask most of the area above the working platform, to reduce the dissipating space of the heat and crumbs produced from the laser engraving process from blocking of the curtain-sheet, and to expel the heat and crumbs along the air induction channel through the exhauster behind the working platform effectively.

In conclusion, according to the description disclosed above, the present invention indeed can achieve the expected objects thereof to provide laser engravers with a masking mechanism, which masks the area above the working platform, to form an air induction channel, and to expel the heat and crumbs effectively.

Although the embodiments of the present invention have been described in detail, those persons skilled in the arts may make many modifications and variations from the teachings disclosed hereinabove, and it should be understood that any modification and variation equivalent to the spirit of the present invention be regarded to fall into the scope defined by the claims.

What is claimed is:

1. A laser engraver with a masking mechanism, comprising a machine body, a laser-engraving mechanism inside the machine body, a working platform, and an exhauster; wherein:
   the laser-engraving mechanism includes a lens-cart rail slidably mounted on a working track; the exhauster is provided with at least one air outlet behind the working platform; and the laser engraver is characterized in that:
   the at least one air outlet is positioned above the working platform, and a masking mechanism is installed above the at least one air outlet, wherein the masking mechanism comprises a rod member and a curtain-sheet reeled onto the rod member, and the rod member is installed in the machine body and connected to one end of the curtain-sheet, and the other end of the curtain-sheet is connected to the lens-cart rail, so that when the lens-cart rail moves above the working platform, the curtain-sheet is reeled out above the working platform to form an air induction channel beneath the curtain-sheet of the masking mechanism.

2. The laser engraver with the masking mechanism according to claim 1, wherein the masking mechanism further includes a reeling component, for reeling the curtain-sheet onto the rod member.

3. The laser engraver with the masking mechanism according to claim 1, wherein the end of the curtain-sheet connected to the lens-cart rail is provided with a plurality of through holes, and the lens-cart rail is provided with a connecting member to buckle to the through holes.

4. The laser engraver with the masking mechanism according to claim 1, wherein the curtain-sheet is made of a transparent material.

5. The laser engraver with the masking mechanism according to claim 1, wherein between a front side of the machine body and the lens-cart rail is provided with another masking mechanism so that each of the two sides of the lens-cart rail is provided with the masking mechanism respectively.

6. The laser engraver with the masking mechanism according to claim 4, wherein a second masking mechanism comprises a second rod member and a second curtain-sheet reeled onto the second rod member, wherein the second rod member is installed on the machine body, and connected to one end of the second curtain-sheet, and the other end of the second curtain-sheet is combined with the lens-cart rail, so that when the lens-cart rail moves above the working platform, the second curtain-sheet is reeled out above the working platform.

7. The laser engraver with the masking mechanism according to claim 5, wherein the second masking mechanism further comprises a second reeling component, for reeling the curtain-sheet on the second rod member.

8. The laser engraver with the masking mechanism according to claim 5, wherein the one end of the second curtain-sheet is combined with the lens-cart rail is provided with a plurality of through holes, and the lens-cart rail is provided with a connecting member to buckle to the through holes.

9. The laser engraver with the masking mechanism according to claim 5, wherein the second curtain-sheet is made of a transparent material.

* * * * *